Sept. 15, 1925.

F. R. BAKER

COMBINED HEAD AND DITCH LAMP

Filed Sept. 10, 1923

1,553,923

Inventor
Frederick R. Baker
By Alexander & Dowell
Attorneys

Patented Sept. 15, 1925.

1,553,923

UNITED STATES PATENT OFFICE.

FREDERICK RUTLEDGE BAKER, OF CHARLESTON, SOUTH CAROLINA.

COMBINED HEAD AND DITCH LAMP.

Application filed September 10, 1923. Serial No. 661,866.

*To all whom it may concern:*

Be it known that I, FREDERICK R. BAKER, a citizen of the United States, residing at Charleston, in the county of Charleston and State of South Carolina, have invented certain new and useful Improvements in Combined Head and Ditch Lamps; and I hereby declare that the following is a full, clear, and exact description thereof, reference being had to the accompanying drawings, which form part of this specification.

This invention is a novel improvement in combined head and ditch lamps for automobiles and the like, and the principal object of the invention is to provide a novel, combined head and ditch lamp adapted to project light rays either from the front face or from side face, or both the front or side faces at the same time, said front and side lights having separately and independently controlled electric circuits controlled by a suitable switch mounted on the dash-board, steering post, or other accessible part of the automobile, whereby both lights can be used simultaneously to light the road immediately in front of the automobile and also to light the road or ditch at each side of the automobile, when travelling at night along a narrow or dangerous road, or whereby when two automobiles are approaching at night, the head lights in the front faces of the lamps and all front lights on both cars may be switched off, leaving the side ditch lights burning to light up the road for each driver, eliminating the blinding headlights now universally used on automobiles and the like, thus insuring the safe passage of the cars, and reducing the numbers of road accidents at night caused by the blinding headlights now used on most cars to a minimum.

Another object of the invention is to provide a novel lamp wherein the reflector for each side or ditch light is designed to project the light rays from the lamp to illuminate the road at each side of the car, and also to project the light rays slightly to the front of the front wheel of the automobile, thereby also illuminating, to a certain extent, the road directly in front of the automobile when the headlights are turned off, the reflector for the ditch light being substantially as large as the reflector for the headlight.

I will explain the invention with reference to the accompanying drawings, which illustrate one practicable embodiment thereof to enable others to adopt and use the same, and will summarize in the claim the novel features of construction, and novel combinations of parts, for which protection is desired.

Figure 1:
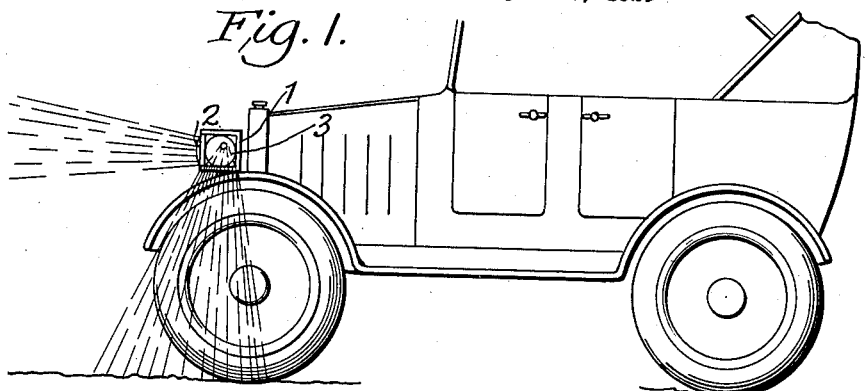
Fig. 1 is a diagrammatic side elevation of an automobile showing my novel head and ditch lamp mounted thereon, and diagrammatically showing the direction of the light rays emanating therefrom.
Figure 2:
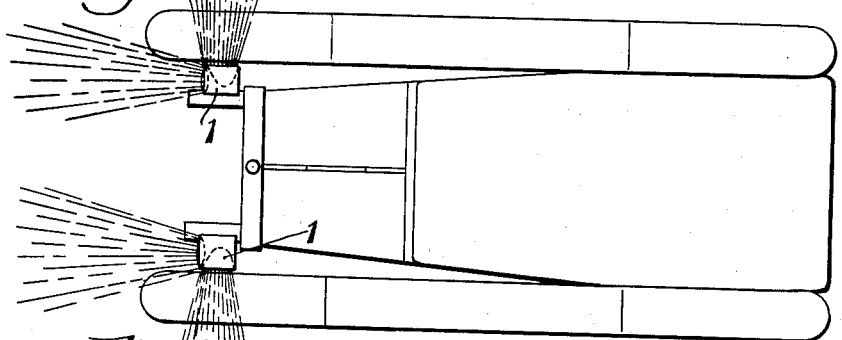
Fig. 2 is a diagrammatic top plan view of Fig. 1.

As shown in the drawings, my novel combined head and ditch lamp is adapted to be mounted at the front end of an automobile in place of the usual head lamps, but is preferably mounted slightly higher than the usual head lamp to allow the side ditch light thereof to project light rays over the top of the front fender to illuminate the ditch or road at the side of the automobile.

Figure 3:
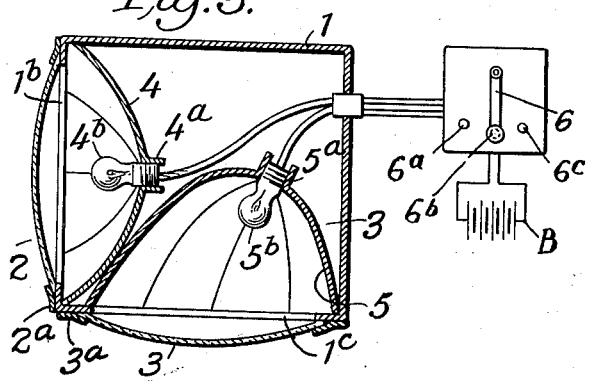
Fig. 3 is an enlarged horizontal detail section through the lamp on line 3—3 Fig. 5 showing the arrangements of the lighting means and reflectors.
Figure 4:
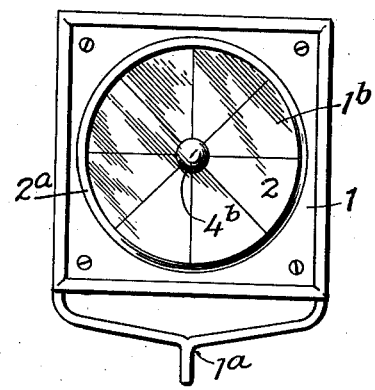
Fig. 4 is a front elevation of my novel lamp.
Figure 5:
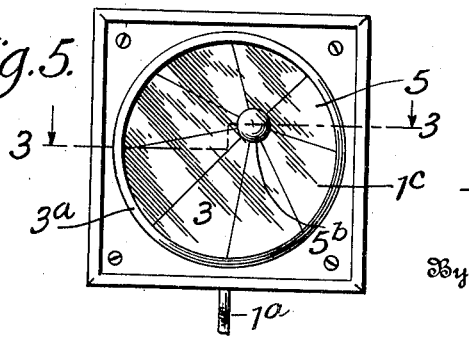
Fig. 5 is a side elevation thereof.

The lamp comprises a casing 1, preferably rectangular, shown in Figs. 3, 4 and 5, but may be of any other desired form said casing 1 being provided with a suitable depending bracket $1^a$, preferably bifurcated as shown, attached to the under side of the casing for the purpose of mounting the lamp at the front end of the automobile in the usual manner.

The front face of the casing is provided with a circular opening $1^b$, closed by a glass 2 mounted in a suitable frame $2^a$ detachably attached to the front face of the casing in any desired manner. One side face of the casing is likewise provided with a circular opening $1^c$, of same size as opening $1^b$ in front face of the casing, said opening $1^c$ being closed by a glass 3 mounted in a suitable frame $3^a$ attached to the side face of the casing in any desired manner. Glass closures 2 and 3 may be of any desired color or form, and may be mounted on the casing 1 to cover the openings $1^b$ and $1^c$ respectively in any desired manner, the particular means for mounting same on the casing forming no part of the present invention.

Within the casing 1, cooperating with the opening $1^b$, is a reflector 4 of any desired form, in the center of which reflector is mounted an electric light bulb 4ᵇ in a suitable socket 4², said bulb 4ᵇ forming the lighting means for illuminating the head light on the front face of the lamp.

Within the casing 1, cooperating with the opening 1ᶜ, is a reflector 5, of the same general size and shape as reflector 4ᵐ, which reflector 5 at the center thereof, is mounted an electric light bulb 5ᵇ in a suitable socket 5ᵃ. Preferably the axis of reflector 5 is so disposed with respect to the axis of the casing 1 that the light rays emanating from the bulb 5ᵇ will be projected through the opening 1ᶜ to not only illuminate the road at the side of the automobile but will also be projected slightly forward of the front wheels of the automobile to illuminate the road in front of the automobile, the axis of the reflector 5 slanting slightly forwardly toward the front end of the casing as shown in Fig. 3.

Sockets 4ᵃ and 5ᵃ, are preferably independently electrically connected to battery b through a suitable switch 6, preferably mounted on the dash board, steering post, or other accessible part of the automobile, which switch 6 is adapted to be thrown to light bulbs 4ᵇ or 5ᵇ separately, or simultaneously, as desired. When the arm of switch 6 is contacting with contact 6ᵃ then the bulb 5ᵇ will be lighted; when contacting with contact 6ᵇ then bulb 4ᵇ will be lighted, and when contacting with contact 6ᶜ then both bulbs 4ᵇ and 5ᵇ will be simultaneously lighted.

In operation, when running at night over narrow and dangerous roads the operator may throw the switch to contact with point 6ᶜ to illuminate both bulbs 4ᵇ and 5ᵇ simultaneously, thereby illuminating the road not only directly in front of the machine but also illuminating the adjacent sides of the road and the ditches or gutters on either side of the automobile, thus preventing possibility of accident when travelling over such narrow, and dangerous roads at night. When however two machines approach on the same road, the operators of both machines may throw the switch to contact with point 6ᵃ thus turning off the headlights 4ᵇ and leaving the ditch lights 5ᵇ burning, thus illuminating the sides of the road adjacent each machine without blinding the operator of the approaching machine. The ditch light reflector 5 is substantially the same size as the head light reflector 4 and since the axis of the ditch light reflector slants slightly towards the front end of the casing the light rays from the ditch light 5ᵇ will be thrown not only to the side of the automobile but also slightly in front of the front wheels of the automobile, partially illuminating the road directly in front of the automobile, and at the same time lighting the ditches and sides of the road adjacent each machine, without any glare from the headlights.

My combined head and ditch lamp also eliminates the usual dimmers used on most headlights now in use, and the other numerous lighting devices attached to the cars; will tend to prevent accidents or collisions by automobiles or the like when running at night, and will eliminate the difficulty of night driving due to the blinding headlights on approaching automobiles.

I claim:

A combined head and ditch lamp, comprising a rectangular casing having an opening in its front end and an opening in its outer side; a removable transparent closure for each of said openings; a parabolic reflector secured within said casing adjacent the front opening, a reflector secured in the casing adjacent the side opening, the latter reflector having its axis inclined downwardly and forwardly towards the front so that the light rays emitted therefrom will be directed downwardly and in front of said casing; an electric light support at the axis of each reflector, and means for mounting said casing on the front end of a vehicle adjacent the side thereof, with the side opening outermost.

In testimony that I claim the foregoing as my own, I affix my signature.

FREDERICK RUTLEDGE BAKER.